Patented June 18, 1929.

1,717,600

UNITED STATES PATENT OFFICE.

HOWARD L. BENDER, OF BLOOMFIELD, NEW JERSEY, ASSIGNOR TO BAKELITE CORPORATION, OF NEW YORK, N. Y., A CORPORATION OF DELAWARE.

PHENOL-RESIN COMPOSITION.

No Drawing.   Application filed November 10, 1926.   Serial No. 147,619.

This invention relates to novel resinous compositions including reaction products of formaldehyde or its polymers, or other methylene-containing substances, with phenols, said resins characterized by a light and permanent color and excellent physical properties. These new resins are available for the manufacture of transparent or colored articles, light colored lacquers and enamels, for white or light colored molding compounds, and for other purposes.

If phenol or cresol and formaldehyde be caused to react in approximately equimolecular proportions, alone or in presence of catalysts, resinous products are formed which however contain some uncombined phenol, since the reaction is not strictly quantitative. If the proportion of formaldehyde or equivalent methylene-containing body such as hexamethylenetetramine, be progressively increased, a point is ultimately reached where free phenol can no longer be detected. For example by reacting on phenol with about three molecular proportions of formaldehyde, in presence of small proportions of basic catalysts, resinous products result which are nearly colorless, and which do not darken or develop color on exposure to light and air as is the case when free phenol is present even in minute quantity. These resinous products contain however residual formaldehyde, presumably largely as paraform, in solid solution in the resin.

According to the present invention I prepare a phenolic resin characterized by absence of free phenol and presence of formaldehyde, paraform or equivalent methylene-containing body; and I bind this methylene-containing body, or the larger proportion thereof, in the form of a non-phenolic resin. Thereby I am enabled to obtain at will clear and substantially colorless, homogeneous resins which are reactive in the sense that by application of sufficient heat they undergo transformation to an infusible and insoluble body of resinoid characteristics.

Following are certain specific examples in accordance with the invention, it being understood that the examples are illustrative only, and the invention is not restricted to the particular materials, proportions or manipulations as therein described:

145 parts by weight of phenol are heated with 412 parts of 40% formaldehyde solution, in presence of 1–5 parts of sodium carbonate or other basic catalyst. Heating is continued until separation of water occurs, and, preferably under reduced pressure, until the water is evaporated. During this operation the uncombined formaldehyde, which was originally introduced in large excess of the equimolecular proportions, passes over largely into paraform which dissolves in the resin. Thereupon 40 parts of urea are added, together with sufficient lactic, boric, phosphoric or other acid to establish acid conditions in the mass; and the heating is continued to effect a reaction between the urea and the paraform. When a varnish or lacquer is to be prepared the addition of alcohol or other solvent may either precede or follow the addition of the urea.

In the above example the amount of urea added may be widely varied say from 20 to 100 parts, preferably avoiding however such excess as would lead to the presence of any substantial amount of uncombined urea in the product. The proportion of urea added should not exceed one mol for each two mols of residual paraform or formaldehyde, and is preferably kept distinctly below this proportion, since any excess of urea renders the resin less resistant to the action of moisture.

Instead of urea, I may use homologs or derivatives thereof, such as thio-urea; or in general any such urea derivatives as yield with formaldehyde or its equivalents a suitable resinous product.

Instead of urea or its derivatives I may use other resin-forming additions of non-phenolic character, my object being as stated above, to bind the excess methylenes in the form of a non-phenolic and light-permanent resin. One such addition which has been found satisfactory is paratoluenesulfonamide, which reacts directly with formaldehyde, paraform or equivalent methylene-containing bodies to yield a resinous product having an excellent plasticizing effect upon the phenol-methylene resins.

The resinous products prepared as above may be compounded with fillers of any kind for the preparation of molding mixtures, which may be white or of any desired color according to the particular filler chosen. They may also be dissolved in any of the usual varnish or lacquer solvents or solvent mixtures for the preparation of coating or impregnating solutions of any kind.

The present method, and the resins prepared thereby, are to be clearly distinguished from mixed resins prepared for example by commingling pre-formed phenol-methylene and urea-methylene resins; or by reacting with formaldehyde upon mixtures of phenols and urea, etc.; all such resins being subject to the objection mentioned above that they contain free phenol, unless prepared with a sufficient excess of formaldehyde or its equivalents so that a considerable excess of uncombined methylenes appear in the product.

Polymers of formaldehyde, and all bodies capable of engendering formaldehyde are to be regarded as equivalent to formaldehyde for the purposes of this invention.

Phenol-methylene resins containing paratoluenesulfonamide or resinous derivatives thereof, and the process of making the same, are specifically claimed in my copending application, Serial No. 147,620 filed November 10, 1926.

I claim:

1. Method of making a resin composition, comprising reacting a phenol with formaldehyde, the latter in excess of equimolecular proportions; and combining a portion at least of the excess formaldehyde in the form of a resinous urea derivative.

2. Method of making a resin composition, comprising reacting a phenol with formaldehyde, the latter in excess of equimolecular proportions, in presence of a basic catalyst; and combining a portion at least of the excess formaldehyde, in presence of an acid catalyst, in the form of a resinous urea derivative.

3. The hereindescribed resin composition characterized by freedom from uncombined phenols, and by the presence of resinous phenol-methylene and urea-methylene derivatives.

4. Method of making a resin composition, comprising reacting a phenol with formaldehyde, the latter in excess of equimolecular proportions; and combining a portion at least of the excess formaldehyde in the form of a non-phenolic resin.

5. The hereindescribed resin composition characterized by freedom from uncombined phenols and uncombined methylene groups, and by the presence of a phenolic methylene resin and a non-phenolic methylene resin.

In testimony whereof, I affix my signature.

HOWARD L. BENDER.

DISCLAIMER 1,717,600.—*Howard L. Bender*, Bloomfield, N. J. PHENOL-RESIN COMPOSITION. Patent dated June 18, 1929. Disclaimer filed July 25, 1933, by the assignee, *Bakelite Corporation*.

Hereby enters this disclaimer to the compositions set forth in claims 3 and 5 except where the "resinous phenol-methylene" of claim 3 and the "phenolic methylene resin" of claim 5 are of the kind formed by reaction of a phenol in the presence of excess molecular proportions of methylene and a catalyst.

[*Official Gazette August 29, 1933.*]

The present method, and the resins prepared thereby, are to be clearly distinguished from mixed resins prepared for example by commingling pre-formed phenol-methylene and urea-methylene resins; or by reacting with formaldehyde upon mixtures of phenols and urea, etc.; all such resins being subject to the objection mentioned above that they contain free phenol, unless prepared with a sufficient excess of formaldehyde or its equivalents so that a considerable excess of uncombined methylenes appear in the product.

Polymers of formaldehyde, and all bodies capable of engendering formaldehyde are to be regarded as equivalent to formaldehyde for the purposes of this invention.

Phenol-methylene resins containing paratoluenesulfonamide or resinous derivatives thereof, and the process of making the same, are specifically claimed in my copending application, Serial No. 147,620 filed November 10, 1926.

I claim:

1. Method of making a resin composition, comprising reacting a phenol with formaldehyde, the latter in excess of equimolecular proportions; and combining a portion at least of the excess formaldehyde in the form of a resinous urea derivative.

2. Method of making a resin composition, comprising reacting a phenol with formaldehyde, the latter in excess of equimolecular proportions, in presence of a basic catalyst; and combining a portion at least of the excess formaldehyde, in presence of an acid catalyst, in the form of a resinous urea derivative.

3. The hereindescribed resin composition characterized by freedom from uncombined phenols, and by the presence of resinous phenol-methylene and urea-methylene derivatives.

4. Method of making a resin composition, comprising reacting a phenol with formaldehyde, the latter in excess of equimolecular proportions; and combining a portion at least of the excess formaldehyde in the form of a non-phenolic resin.

5. The hereindescribed resin composition characterized by freedom from uncombined phenols and uncombined methylene groups, and by the presence of a phenolic methylene resin and a non-phenolic methylene resin.

In testimony whereof, I affix my signature.

HOWARD L. BENDER.

DISCLAIMER 1,717,600.—*Howard L. Bender*, Bloomfield, N. J. PHENOL-RESIN COMPOSITION. Patent dated June 18, 1929. Disclaimer filed July 25, 1933, by the assignee, *Bakelite Corporation*.

Hereby enters this disclaimer to the compositions set forth in claims 3 and 5 except where the "resinous phenol-methylene" of claim 3 and the "phenolic methylene resin" of claim 5 are of the kind formed by reaction of a phenol in the presence of excess molecular proportions of methylene and a catalyst.

[*Official Gazette August 29, 1933.*]